United States Patent [19]

Benner

[11] 4,060,477
[45] Nov. 29, 1977

[54] APPARATUS FOR REMOVING IONS FROM AN IONIZED LIQUID

[76] Inventor: Philip E. Benner, 1739 Randolph Road, Schenectady, N.Y. 12308

[21] Appl. No.: 756,199

[22] Filed: Jan. 3, 1977

[51] Int. Cl.$^2$ .............................................. C02B 1/14
[52] U.S. Cl. .......................... 204/300 R; 204/180 R; 204/180 P; 204/299 R; 210/37 R; 210/38 R
[58] Field of Search ................... 204/300, 180 R, 269, 204/222, 212, 299; 210/24, 37, 38

[56] References Cited

U.S. PATENT DOCUMENTS

| | | | |
|---|---|---|---|
| 1,301,832 | 4/1919 | Gerber | 204/212 |
| 1,494,152 | 5/1924 | Cowper-Coles | 204/222 X |
| 3,396,097 | 8/1968 | Wolcott | 204/300 R |
| 3,448,026 | 6/1969 | Benner | 204/180 R |
| 3,972,799 | 8/1976 | Taylor et al. | 204/300 R |

OTHER PUBLICATIONS

Ellis, "Fresh Water From the Ocean", (1954) pp. 40–44.
Nernst, "Theoretical Chemistry "(1895) p. 321.

Primary Examiner—Arthur C. Prescott
Attorney, Agent, or Firm—Joseph V. Claeys

[57] ABSTRACT

The system for removing ions from an ionized liquid of the type employing rotating bipolar electrodes wherein at least one of the electrodes is provided with a surface comprising a plurality of segments of electrically conducting material, each of which segments is electrically insulated from the other and with brush contact means to apply one polarity voltage to a plurality of segments on one side of the electrode and the opposite polarity voltage to a similar plurality of segments on the opposite side of the electrode to provide the voltage polarity difference between the two sides of the electrode to cause ion adsorption from one part of the ionized liquid and ion rejection to another portion of the ionized liquid.

13 Claims, 2 Drawing Figures

APPARATUS FOR REMOVING IONS FROM AN IONIZED LIQUID

BACKGROUND OF THE INVENTION

This invention relates to apparatus and systems for the removal of ions from an ionized liquid (e.g., desalination of sea water) and more particularly to such systems employing rotating bipolar electrodes which operate to effect selective electrically induced ion absorption and ion rejection as disclosed in my U.S. Pat. No. 3,448,026.

In accordance with the invention of my foregoing referenced patent, the ionized liquid (e.g., sea water) is divided into separate portions. Electrical polarities are used to attract cation and anions from a main portion of the liquid and to reject them into other portions of the liquid, all in a continuous operation. If desired, the operation may be performed on the main portion of the liquid a plurality of times in series until all of the ions are removed from such main portion.

While the system of my foregoing referenced patent is entirely satisfactory, it has been found that some electrolysis takes place in the reject portions when separate electrical contacts are employed to establish the voltage differential between the two sides of the electrodes through the liquid. Since any such electrolysis reduces the overall efficiency of the system, it is desirable to carry on further research work in an attempt to further improve and simplify the system and to improve its overall efficiency.

SUMMARY OF THE INVENTION

The present invention has for its general object to utilize the same or similar principles of the invention of my foregoing referenced patent and to both simplify and improve the system and improve its efficiency. I have discovered that the system can be made simpler and more efficient by directly establishing a voltage differential between the opposite sides of one of the rotating electrodes. This is accomplished in accordance with the present invention by providing one of the rotating electrodes as a "segmented electrode". Brush contact means are provided which are operatively associated with such segmented electrode and with a suitable source of potential to apply one polarity potential to one surface portion of the segmented electrode and the opposite polarity potential to a similar surface portion of the electrode disclosed opposite the one surface portion.

As used throughout the specification and in the appended claims, the term "segmented electrode" means an electrode having a surface comprising a plurality of segments of electrically conducting material each of which segments is electrically insulated from the other.

BRIEF DESCRIPTION OF THE FIGURES OF THE DRAWING

The novel features believed characteristic of the invention are set forth with particularity in the appended claims. The invention itself, together with further objects and advantages thereof, may best be understood by reference to the following detailed description taken in conjunction with the accompanying drawing in which

DETAILED DESCRIPTION

Figure 2:
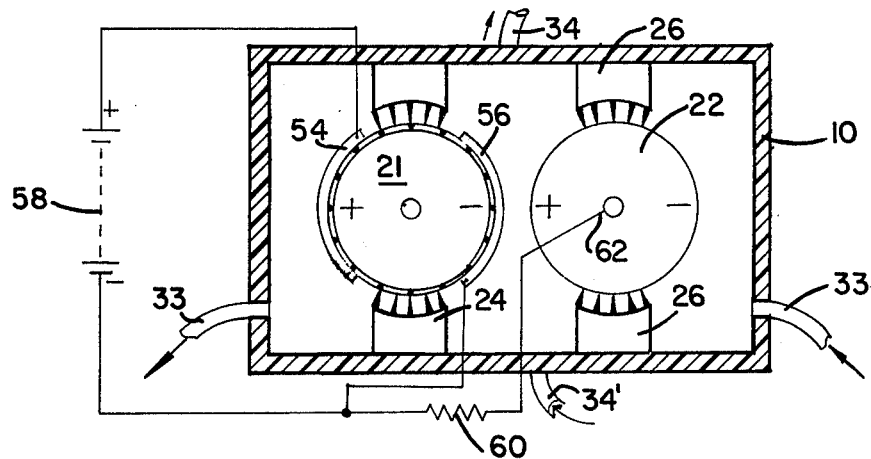
FIG. 1 is a schematic sectional elevation of a simple apparatus constructed in accordance with the invention and FIG. 2 is a schematic plan view taken along the line 2—2 of FIG. 1.
Figure 1:
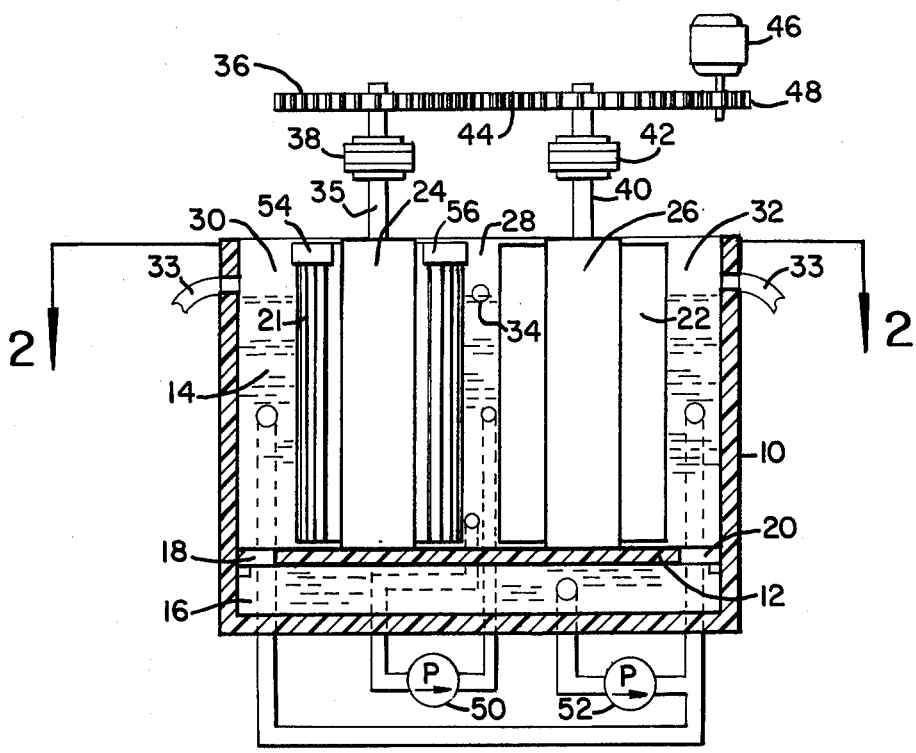

Referring now to FIGS. 1 and 2 of the drawing, the apparatus illustrated comprises a container 10 for the ionized liquid. Container 10 is constructed of any suitable electrically non-conducting material, such as plastic or the like, and includes a sub-base 12 which divides the container into an upper portion 14 and a lower portion 16. Openings 18 and 20 are provided at opposite ends of sub-base 12 to provide for communication at such openings between the upper and lower portions 14 and 16.

A pair of adjacent electrodes 21 and 22, shown as being of cylindrical configuration, are mounted for rotation within the upper portion 14 of container 10. Electrodes 21 and 22 are disposed in adjacent spaced-apart relationship. The spacing of the electrodes 21 and 22 is not especially critical. However, the spacing should not be so small for the voltage employed that electrolysis takes place in the space between them. Seal means 24 and 24' and 26 and 26' are provided in container 10 and are operatively associated with the cylindrical electrodes 21 and 22 to effectively divide the liquid in the container into a central zone 28 and a common outer zone having two portions 30 and 32 which communicate freely with each other through the openings 18 and 20 at the ends of sub-base 12. The liquid in central zone 28 is kept separated from the liquid in the outer zone by action of the seal means 24—24' and 26—26' while at the same time there is free flow of liquid between portions 30 and 32. Discharge openings 33 are provided in container 10 from portions 30 and 32 and a discharge opening 34 is provided in container 10 from the central zone 28.

Means are provided to rotate the electrodes 21 and 22. To this end, electrode 21 is provided with a central shaft means 35 having one end disposed in a suitable bearing means (not shown) in the sub-base 12. A gear 36 is affixed to the other end of shaft means 35. Preferably, an electrically insulating coupling means 38 is provided in shaft means 35 as illustrated. A similar central shaft means 40 is provided for electrode 22 which is also provided with a suitable electrically insulated coupling means 42. A gear 44 is affixed to the end of shaft means 40 and meshes for driving engagement with the gear 36. Gears 36 and 40, and their associated electrodes 21 and 22, are driven from a suitable motor 46 through a pinion 48 which meshes with gear 44.

Preferably, electrodes 21 and 22 are provided with a layer or coating of a suitable material which attracts selectively ions; one electrode being provided with a cation adsorption material and the other electrode with an anion adsorption material. Such materials are known in the art and are described, for example, in the publication entitled "1962 Saline Water Conversion Report", issued by the Office of Saline Water, U.S. Department of the Interior in January, 1963. See page 31 in a discussion entitled "Demineralization of Saline Water by Electrically Induced Adsorption on Porous Carbon Electrodes", and also the "Quarterly Report to the Office of Saline Water", U.S. Dept. of the Interior by George W. Reid et al of the University of Oklahoma Research Institute (Grant No. 14-01-001-1454), July 1, 1968, to Sept. 30, 1968 College of Engineering, University of Oklahoma.

The speed of rotation of electrodes 21 and 22 is selected to optimize the adsorption of ions on the electrode surface. For example, the speed should be low enough to assure that there is time for the surface regions of electrodes 21 and 22 which are in central zone 28 to adsorb a maximum of ions. In one particular apparatus, for example, having electrodes of 3 inch diameter, a rotational speed of 1 ½ RPM was found to be quite satisfactory. The characteristics of the ion-attracting material used will also have an effect on the rotational speed to be employed.

It may be desirable to provide for positive circulation and establish some turbulence in the liquid in both the central zone 28 and the portions 30 and 32 of the outer zone. This may conveniently be provided by the pump means 50 which is arranged to circulate the liquid in the portions 30 and 32 of the outer zone.

In accordance with this invention, means are provided to directly establish a voltage polarity difference between the two sides of the electrode to cause electrically induced ion adsorption from one portion of the liquid and ion rejection to another portion thereof.

To this end, electrode 21 is provided as a segmented electrode. Brush contact means 54 and 56 are disposed on opposite sides of electrode 21. Each brush contact means contacts a similar number of segments of electrode 21. For example, brush contact means 34 is arranged to make contact with a number of segments on the opposite side of electrode 21 which are disposed in the liquid in central zone 28. Brush contact means 56 is arranged to make contact with a similar number of segments on the opposite side of electrode 21 which are disposed in the liquid in the portion 30 of the outer zone. The plurality of segments contacted by brush contact means 54 constitutes a first surface region of the electrode 21 and the plurality of segments contacted by the brush contact means 56 constitutes a second surface region of the electrode 21 and which second surface region is disposed directly opposite the first surface region.

One side of a suitable direct current voltage source 58 is connected to brush contact means 54 and the other side of voltage source 58 is connected to brush contact means 56. Thus, one polarity potential is connected to the plurality of segments on one side of electrode 21 by means of brush contact means 54 and the opposite polarity potential is connected to the plurality of segments on the opposite side of electrode 21 by means of brush contact means 56. A desired voltage differential is thus directly established between the opposite sides of segmented electrode 21 as illustrated. The opposite sides of electrode 22 will also be of opposite polarities as illustrated, one polarity at the surface region disposed in central zone 28 and the opposite polarity at the surface region disposed in portion 32 of the outer zone. If, in a particular case, it is found that the ion-rejection part of the operation takes somewhat more power than the ion-adsorption phase, a small amount of current may be shunted around the ionized liquid in center zone 28. This may be conveniently accomplished as illustrated in FIG. 2 by connecting a suitable resistance 60 from one side of the voltage source 58 to the shaft means 40 of electrode 22 by a suitable electrical contact means 62. The shaft 40 is electrically connected to the outer surface of the electrode 22.

In the arrangement of my prior patent No. 3,448,026 it was found that the overall operation of the system involved some electrolysis in the "reject" part of the system resulting in some loss of efficiency.

By the foregoing described arrangement wherein a segmented electrode is employed, it is possible to directly establish the voltage differential between the two sides of the electrode necessary to cause ion-adsorption from one part of the ionized liquid and ion-rejection in the other part and without any electrolysis to reduce the system efficiency.

Seal means 24 — 24' and 26 — 26' are operative to prevent the interchange of liquid between the central zone 28 and the portions 30 and 32 of the outer zone. At the same time the system allows the free flow of ionized liquid and movement of ions between the portions 30 and 32 which acts to complete the electric circuit between the positive and negative sides of the segmented electrode.

In operation, the ionized liquid is added in central zone 28. Electrically induced ion-adsorption takes place on the surface regions of electrodes 21 and 22 which are disposed in the central zone 28. The deionized liquid is discharged from discharge opening 34. The rotation of electrodes 21 and 22 causes the adsorbed ions to be transported from the central zone 28 to the portions 30 and 32 of the outer of "reject" zone, where, because of the change in the polarity of the electrode surfaces in zones 30 and 32, the adsorbed ions are rejected to the liquid in the portions 30 and 32. A flow of the ionized liquid is maintained through the portions 30 and 32 to control the concentration of ions in the "reject" liquid.

Although in accordance with the patent statutes the invention has been described as embodied in concrete form and the principle thereof has been explained together with the best mode in which it is now contemplated applying that principle, it will be understood that the apparatus shown and described is merely illustrative and that the invention is not limited thereto since changes and modifications will readily occur to persons skilled in the art without departing from the true spirit of the invention or from the scope of the appended claims.

What is claimed as new and desired to be secured by letters Patent of the U.S. is:

1. In a system for removing ions from an ionized liquid of the type employing a pair of adjacent rotating bi-polar electrodes having peripheral surfaces of selective ion adsorption material disposed in the ionized liquid and wherein electrically induced ion-adsorption takes place in one portion of the liquid, said ions are transported out of said one portion of the liquid by the rotation of the electrodes and rejected into another portion of the liquid, the improvement comprising:
   a. At least one segmented rotating electrode; and
   b. Brush contact means operatively associated with said segmented electrode and a direct current voltage source for applying one polarity voltage to a plurality of segments on one side of said segmented electrode and the opposite polarity voltage to a similar plurality of segments on the opposite side of said segmented electrode and establish a voltage polarity difference between the two sides of said segmented electrode to effect ion-adsorption from one portion of the ionized liquid and ion-rejection to another portion of the ionized liquid.

2. The system recited in claim 1 wherein one of said rotating electrodes has a cation adsorption peripheral surface and the other electrode has an anion adsorption peripheral surface.

3. The system recited in claim 1 wherein said rotating electrodes are each of a generally cylindrical configuration.

4. The system recited in claim 3 wherein one of said rotating electrodes has a cation adsorption peripheral surface and the other electrode has an anion adsorption peripheral surface.

5. The system recited in claim 1 including seal means operatively associated with each of said electrodes to effectively isolate the said one portion of said liquid from the other portion thereof.

6. The system recited in claim 5 wherein one of said rotating electrodes has a cation adsorption peripheral surface and the other electrode has an anion adsorption peripheral surface.

7. The system recited in claim 1 including seal means operatively associated with each of said electrodes to effectively isolate the liquid contained between confronting surface portions of said adjacent rotating electrodes from the common liquid surrounding the opposite surface portions of said adjacent rotating electrodes.

8. The system recited in claim 7 wherein one of said adjacent rotating bi-polar electrodes has a cation adsorption peripheral surface and the other electrode has an anion adsorption peripheral surface.

9. A system for removing ions from an ionized liquid comprising:
   a. An electrically nonconducting container for said liquid;
   b. A pair of cylindrical electrodes, one of which is a segmented electrode, mounted for rotation and in spaced-apart adjacent relationship within said container, said electrodes having selective ion adsorption peripheral surfaces;
   c. Seal means operatively associated with each of said electrodes to define a liquid-holding central zone containing the confronting surface portions of said adjacent electrodes and first and second liquid-holding outer zones each containing one of the opposite surface portions of said adjacent electrodes;
   d. Inlet and outlet means for said central zone and for said outer zones;
   e. Liquid passage means interconnecting said first and second outer zones to provide for liquid communication between said outer zones;
   f. Brush contact means operatively associated with said segmented electrode and a direct current voltage source for applying one polarity voltage to a plurality of segments on the side of said segmented electrode disposed in said central zone and the opposite polarity voltage to a similar plurality of segments on the side of said segmented electrode disposed in an outer zone to establish a voltage polarity difference between the two sides of said segmented electrode to effect ion-adsorption from the liquid in said central zone, transportation of said ions to said first and second outer zones by rotation of said electrodes and rejection of said ions from said electrodes to the liquid in said outer zones.

10. The system recited in claim 9 wherein one of said electrodes has a cation adsorption peripheral surface and the other electrode has an anion adsorption peripheral surface.

11. The system recited in claim 9 including a first pump means for circulating the liquid within the central zone and second pump means for circulating the liquid within the first and second outer zones.

12. The system recited in claim 11 wherein one of said electrodes has a cation adsorption peripheral surface and the other electrode has an anion adsorption peripheral surface.

13. The system recited in claim 10 including resistance means connected from one terminal of said direct current voltage source to the non-segmented electrode operative to shunt some current around the liquid in the central zone.

* * * * *